United States Patent
Kim

(10) Patent No.: US 8,909,442 B2
(45) Date of Patent: Dec. 9, 2014

(54) VIBRATION REDUCTION CONTROL METHOD AND APPARATUS OF POWER TRAIN BY CONTROLLING MOTOR TORQUE OF ELECTRIC VEHICLE

(71) Applicant: Hyundai Motor Company, Seoul (KR)

(72) Inventor: Choong Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 76 days.

(21) Appl. No.: 13/683,178

(22) Filed: Nov. 21, 2012

(65) Prior Publication Data

US 2014/0046558 A1  Feb. 13, 2014

(30) Foreign Application Priority Data

Aug. 10, 2012  (KR) .................. 10-2012-0087687

(51) Int. Cl.
| | |
|---|---|
| *G06F 7/00* | (2006.01) |
| *G06F 17/00* | (2006.01) |
| *G06F 19/00* | (2011.01) |
| *B60L 15/20* | (2006.01) |
| *B60W 10/04* | (2006.01) |

(52) U.S. Cl.
CPC .............. *B60W 10/04* (2013.01); *B60L 15/20* (2013.01); *Y02T 10/7005* (2013.01)
USPC ............................................................. 701/54

(58) Field of Classification Search
CPC ................................. B60W 10/04; B60I 15/20
USPC ........................................................... 701/54
See application file for complete search history.

(56) References Cited

U.S. PATENT DOCUMENTS

| | | | | |
|---|---|---|---|---|
| 6,314,342 | B1* | 11/2001 | Kramer et al. | .................... 701/1 |
| 7,457,697 | B2* | 11/2008 | Sawada et al. | .................. 701/48 |
| 2005/0049761 | A1* | 3/2005 | Kataoka et al. | ................... 701/1 |
| 2005/0143896 | A1* | 6/2005 | Sawada et al. | .................. 701/96 |
| 2011/0112709 | A1* | 5/2011 | Park et al. | ....................... 701/22 |

FOREIGN PATENT DOCUMENTS

| | | |
|---|---|---|
| EP | 1734238 A1 | 12/2006 |
| JP | 2005-020831 A | 1/2005 |
| JP | 2005-102492 A | 4/2005 |
| JP | 2009-040201 A | 2/2009 |
| JP | 2009-121427 A | 6/2009 |
| JP | 2009-247157 A | 10/2009 |
| JP | 2011 037322 A | 2/2011 |
| KR | 2010-0104639 A | 9/2010 |
| KR | 10-2011-0049934 A | 5/2011 |

* cited by examiner

*Primary Examiner* — Mary Cheung
*Assistant Examiner* — Frederick Brushaber
(74) *Attorney, Agent, or Firm* — Edwards Wildman Palmer LLP; Peter F. Corless

(57) ABSTRACT

The present invention relates to a vibration control method and apparatus of a power train in a vehicle for reducing the vibrations in a power train when driving on a protruded portion of a road surface using a motor torque control. The apparatus comprises a processor configured to determine the generation of vibrations in a power train as the vehicle passes on the protruded portions of the road surface; and calculate a compensation torque for a vibration reduction of the power train when vibrations occur in the power train as the vehicle passes on the protruded portions of the road surface.

14 Claims, 5 Drawing Sheets

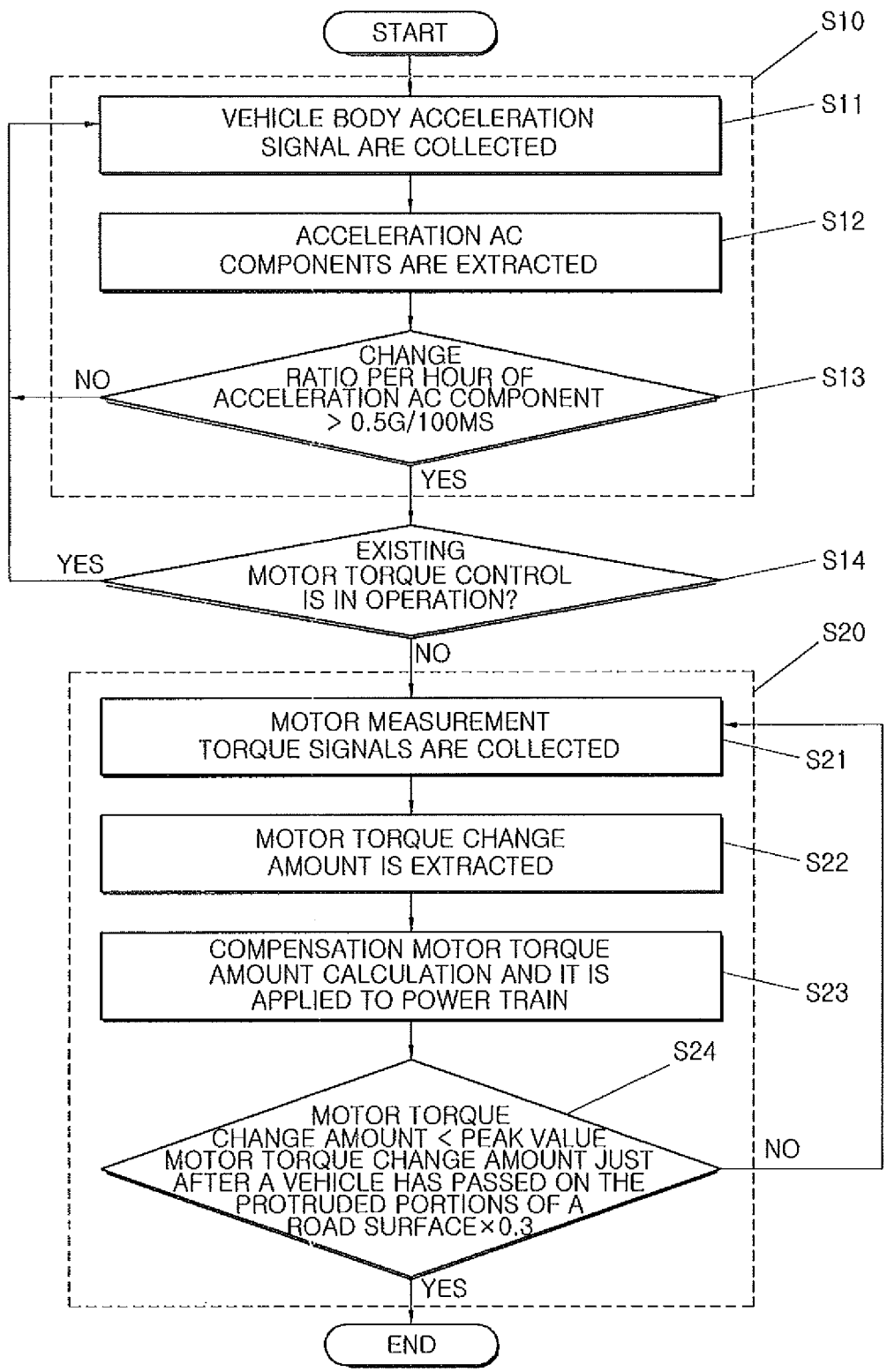

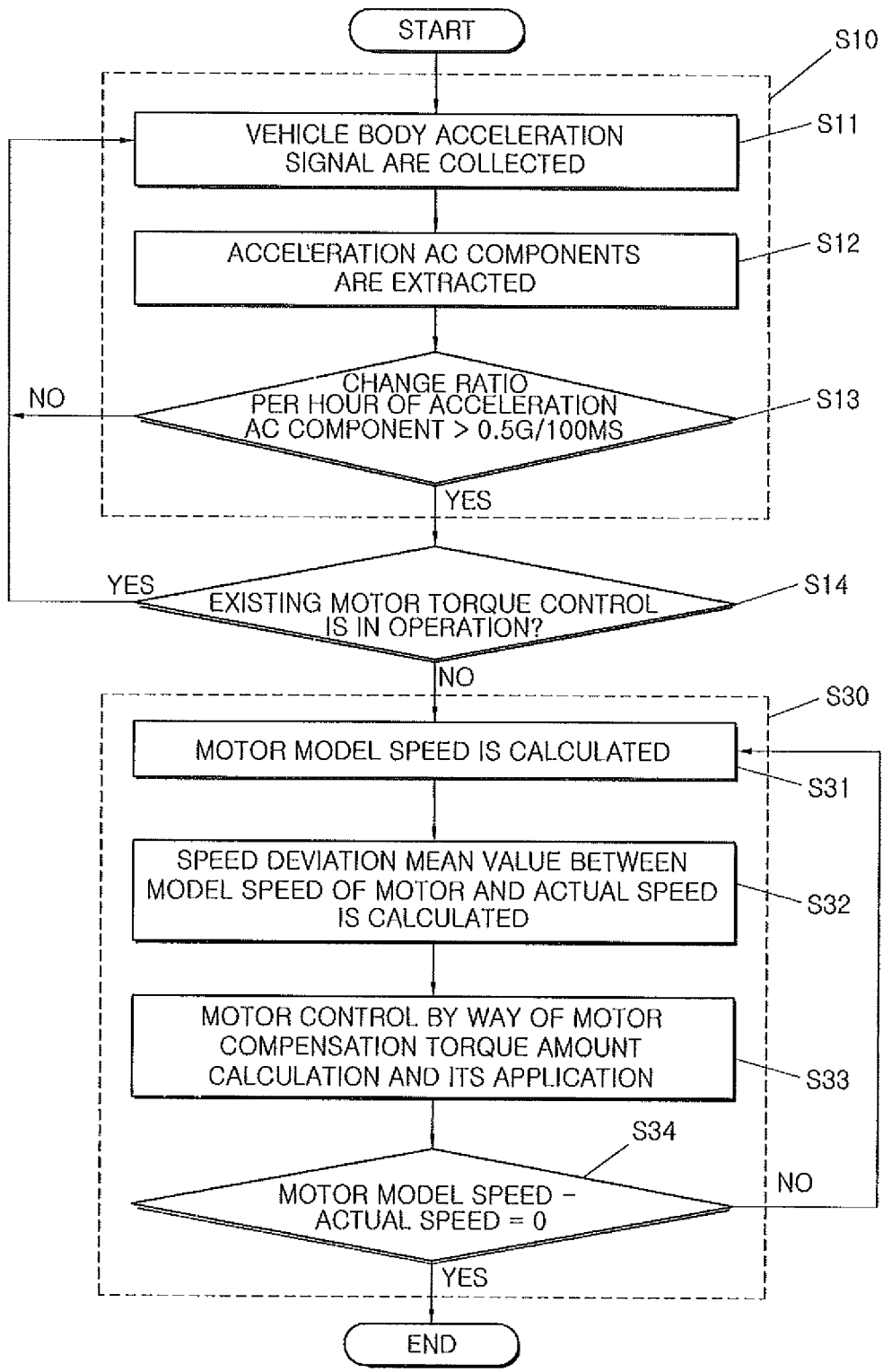

VIBRATION REDUCTION CONTROL METHOD AND APPARATUS OF POWER TRAIN BY CONTROLLING MOTOR TORQUE OF ELECTRIC VEHICLE

CROSS-REFERENCE

This application claims priority to Korean Patent Application No. 10-2012-0087687, filed on Aug. 10, 2012 which is incorporated herein by reference in its entirety.

BACKGROUND OF THE INVENTION

1. Field of the Invention

The present invention relates to a vibration reduction control method and apparatus of a power train by controlling a motor torque of a vehicle, and particularly to a method and apparatus for reducing vibrations occurring in a power train when driving on a protruded portion of a road surface by using a motor torque control.

2. Description of Related Art

Gasoline engines and diesel engines both use fossil fuel and may be disadvantageous due to causing environment contamination from exhaust gas. This environment contamination may be considered a global warming phenomenon due to carbon dioxide and may contribute a respiratory system-related disease due to the ozone generation. A risk of fossil fuel depletion may exists due to the substantially small amount of fossil fuel on the earth.

To attempt to overcome the above mentioned problems, there exist several alternatives to fossil fuel such as an electric vehicle (EV) driven by driving a driving motor, a hybrid electric vehicle (HEV) driven by an engine and a driving motor, and a fuel cell electric vehicle (FCEV) driven by a driving motor with the electric power generated from a fuel cell.

In addition to the above mentioned driving motor, the electric vehicle may comprise a battery as a power charging means which supplies electric power to a driving motor and an inverter for rotating the driving motor. In the fuel battery cell vehicle, a power charging means such as a battery, etc. may be adapted as a sub-driving force source connected in parallel with a fuel cell, a main driving force source. In recent years, a fuel cell hybrid system with a super capacitor functioning as a sub-driving force source in addition to a battery has been developed and is currently in use. Thus, the electric power from a power charging means (or fuel cell) is phase-converted in accordance with a control signal from an inverter controller for driving a driving motor.

Meanwhile, many vibrations occur due to impacts to an electric vehicle on protruded portions of a road surface. Furthermore, the vibrations may be transferred to a vehicle body and a power train via suspensions and may then be transferred to the passengers in the vehicle through the seats and the steering wheel, thus causing unsteadiness. The vibrations generated due to impacts affect a suspension inherent mode and a power train inherent mode; however since the vibrations are transferred from the power trains, it may be difficult to reduce such vibrations due to increased inertia force of the power train.

A rubber mount bush may be disposed on a mount. The mount may be a connection member in mounting a power train in an engine room to prevent the transfer of vibrations. Alternatively, a hydro mount bush may be used, which uses fluid to prevent the transfer of vibrations. In other words, vibration reduction has been attempted using the cushioning effects of rubber and fluid.

The above mentioned method, which may be called a passive method, is directed to preventing the vibrations from being transferred to the indoor space of the vehicle by using a cushioning material as an insulation material for vibrations. The hydro mount bush is generally used in high end vehicles due to high manufacturing costs and the space needed for installation of the mount bush.

SUMMARY OF THE INVENTION

Accordingly, the present invention is made in an effort to improve the above mentioned problems encountered in the related art. It is an object of the present invention to provide a vibration reduction method and apparatus of a power train for controlling a motor torque of an electric vehicle, directed to quickly offsetting the vibration in a power train using a motor control of an electric vehicle and determining when a vehicle passes over protruded portions of a road surface by using an acceleration sensor, and to control a motor torque to function in a reverse direction from the vibrations of a power train.

To achieve the above objects, provided herein is a vibration reduction apparatus of a power train for controlling a motor torque of an electric vehicle, comprising a processor executing a plurality of units. These units include a vibration generation judgment unit configured to determine the generation of vibrations from a power train as a vehicle passes on the protruded portions of a road surface; and a motor reverse torque control unit configured to control a motor torque by calculating a compensation torque for reducing vibrations in the power train when the vibration generation judgment unit determines that vibrations have occurred in the power train as a vehicle passes on the protruded portions of a road surface.

As an exemplary embodiment of the present invention, a vehicle body acceleration sensor may detect an acceleration signal of the vehicle. The vehicle body acceleration sensor may be processed by a band-pass filter, and only a certain frequency band may be passed therethrough, and the change ratio of an acceleration signal component of the passed frequency band may be calculated.

As another exemplary embodiment of the present invention, the motor reverse torque control unit may be configured to calculate a motor torque change due to the vibrations in a power train and to control the motor torque using a negative feedback control in which a compensation torque is added resulting in a motor torque change less than a certain threshold value.

As yet another exemplary embodiment of the present invention, a model speed calculation unit, executed by a processor, may be configured to calculate a model speed of a motor with no vibrations considered; and the motor reverse torque control unit may be configured to control a motor torque using a negative feedback control, resulting in zero speed deviation between the model speed of the motor and the actual speed.

To achieve the above objects, provided herein is a vibration reduction method of a power train for controlling a motor torque of an electric vehicle, comprising receiving, by a processor, an acceleration signal of the vehicle from a vehicle body acceleration sensor by a hand-pass filter; measuring, by the processor, a size of an acceleration signal component of a frequency band which has passed through the band-pass filter and determining an occurrence of vibrations in the power train when a change ratio per hour of the size of the acceleration signal component exceeds a certain threshold value; calculating, by the processor, a compensation motor torque for reducing the vibrations in the power train when the vibrations occur in the power train as a vehicle passes on protruded portions of a road surface; and applying, by the processor, the calculated compensation motor torque to the power train to compensate the vibrations of the power train.

As an exemplary embodiment of the present invention, the calculating of the compensation motor torque comprises detecting, by the processor, a motor measurement torque signal; calculating, by the processor, the compensation motor torque to measure the size of the motor measurement torque signal component of the certain frequency band which has passed through the band-pass filter, to calculate the change of the motor torque due to the vibrations of the power train and to subtract the change of the motor torque based on the vibrations in the power train from the motor torque calculated depending on the driving mode of the electric vehicle.

In particular, the processor may determine that the vibrations of the power train have been offset when the size of the motor torque change is less than a certain threshold vale, thus the compensation with respect to the vibrations of the power train may end.

Furthermore, the certain threshold value may be determined by [threshold value=gain*(peak value of the motor torque change just after the vehicle has passed on protruded portions of a road surface)].

As another exemplary embodiment of the present invention, calculating, by the processor, a model speed of a motor having no vibrations in a power train and in a driving shaft; calculating an actual speed of the motor; and calculating a speed deviation mean value by obtaining a speed deviation between a model speed of the motor and an actual speed, the compensating of the vibrations of the power train comprising determining, by a processor, a motor torque compensation for reducing vibrations of the power train; and calculating zero speed deviation between the model speed of the motor and the actual speed, in response to using a negative feedback control to which the motor torque compensation is applied to compensate the vibrations in the power train.

In particular, the compensation motor torque may determined by [compensation torque=gain*((model speed−actual speed)−speed deviation mean value)].

As another exemplary embodiment of the present invention, not performing the motor torque control for vibration reduction of the power train when any one of a traction control system, an ABS (Anti-lock Brake System), an electronic controlled suspension or an anti-jerk in the middle of a tip-in/-out are currently being executed.

The present invention may make it possible to eliminate vibration components occurring from a power train when an electric vehicle passes on protruded portions of a road surface by using a motor torque control, thus obtaining stable driving conditions and lowering manufacturing costs of an electric vehicle.

BRIEF DESCRIPTION OF THE DRAWINGS

FIG. 4 is an exemplary flow chart of a power train vibration reduction method for an electric vehicle according to an exemplary embodiment of the present invention.

FIG. 5 is an exemplary flow chart of a power train vibration reduction method for an electric vehicle according to another exemplary embodiment of the present invention.

DESCRIPTION OF PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although the above exemplary embodiment is described as using a plurality of units to perform the above process, it is understood that the above processes may also be performed by a single controller or unit.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The exemplary embodiments of the present invention will be described with reference to the accompanying drawings.

Figure 1:
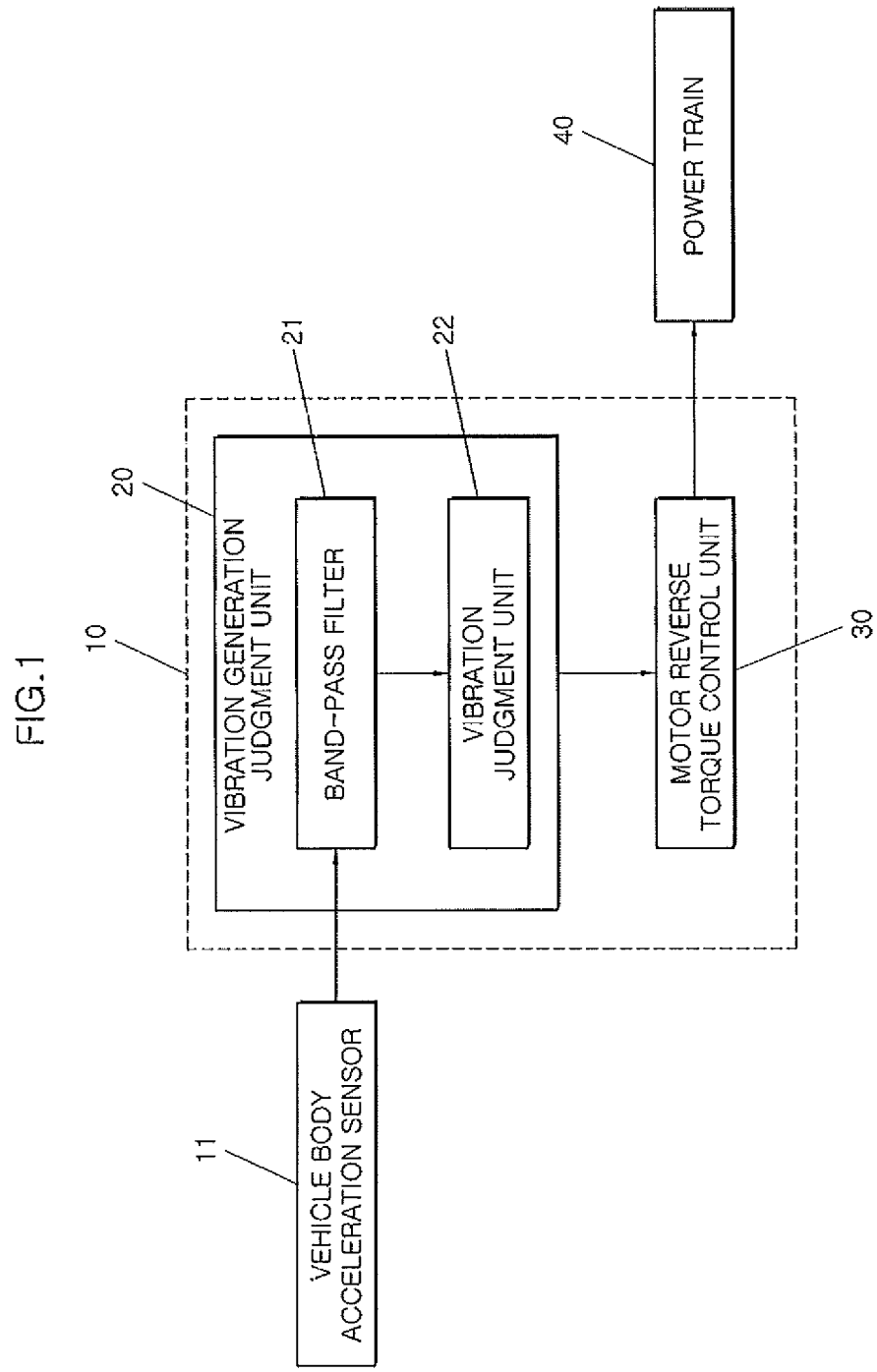
FIG. 1 is an exemplary view illustrating a control of a power train vibration reduction apparatus for an electric vehicle according to an exemplary embodiment of the present invention.
Figure 2:
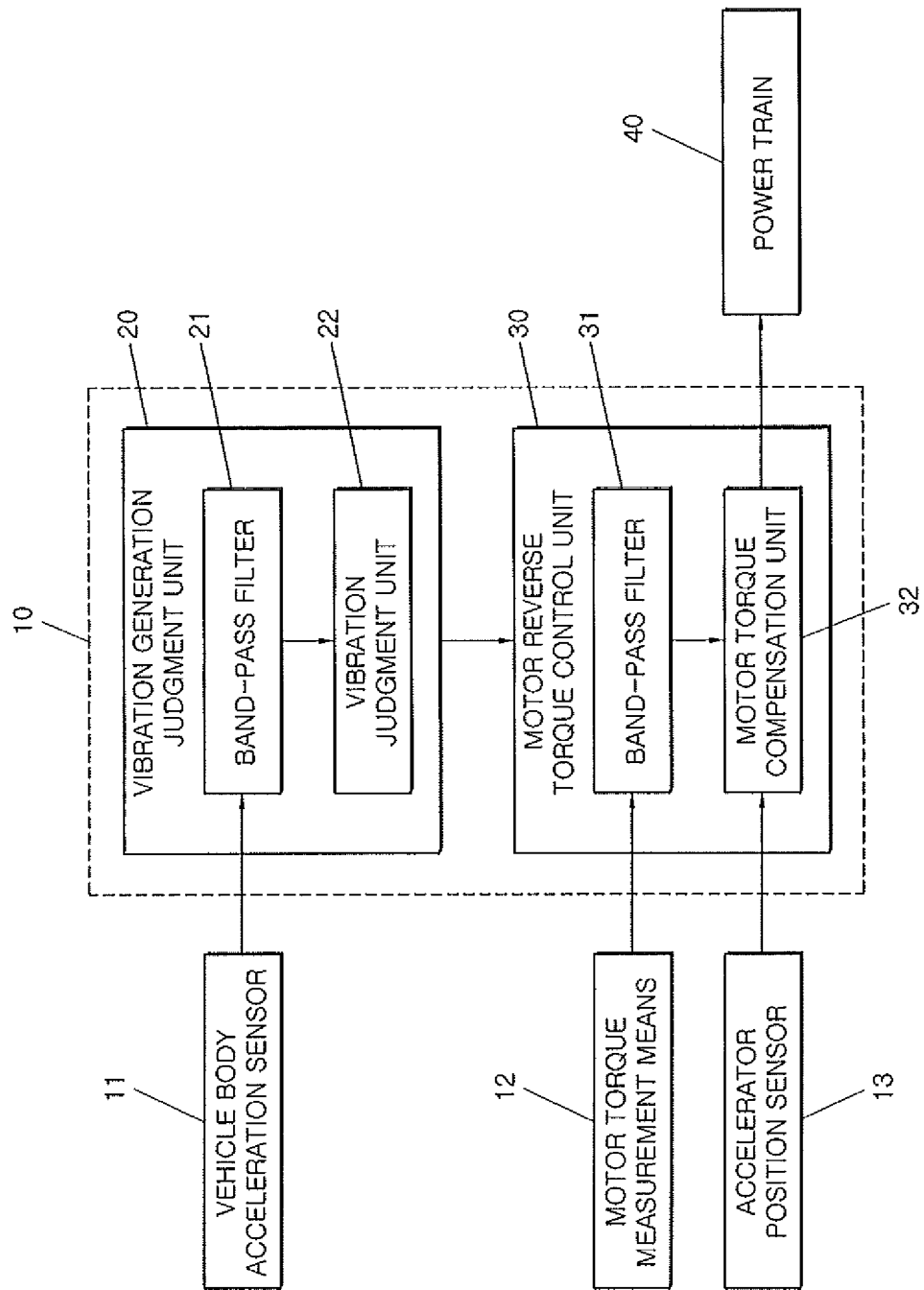
FIG. 2 is an exemplary view illustrating a control of a power train vibration reduction apparatus for an electric vehicle, including an accelerator position sensor according to an exemplary embodiment of the present invention.
Figure 3:
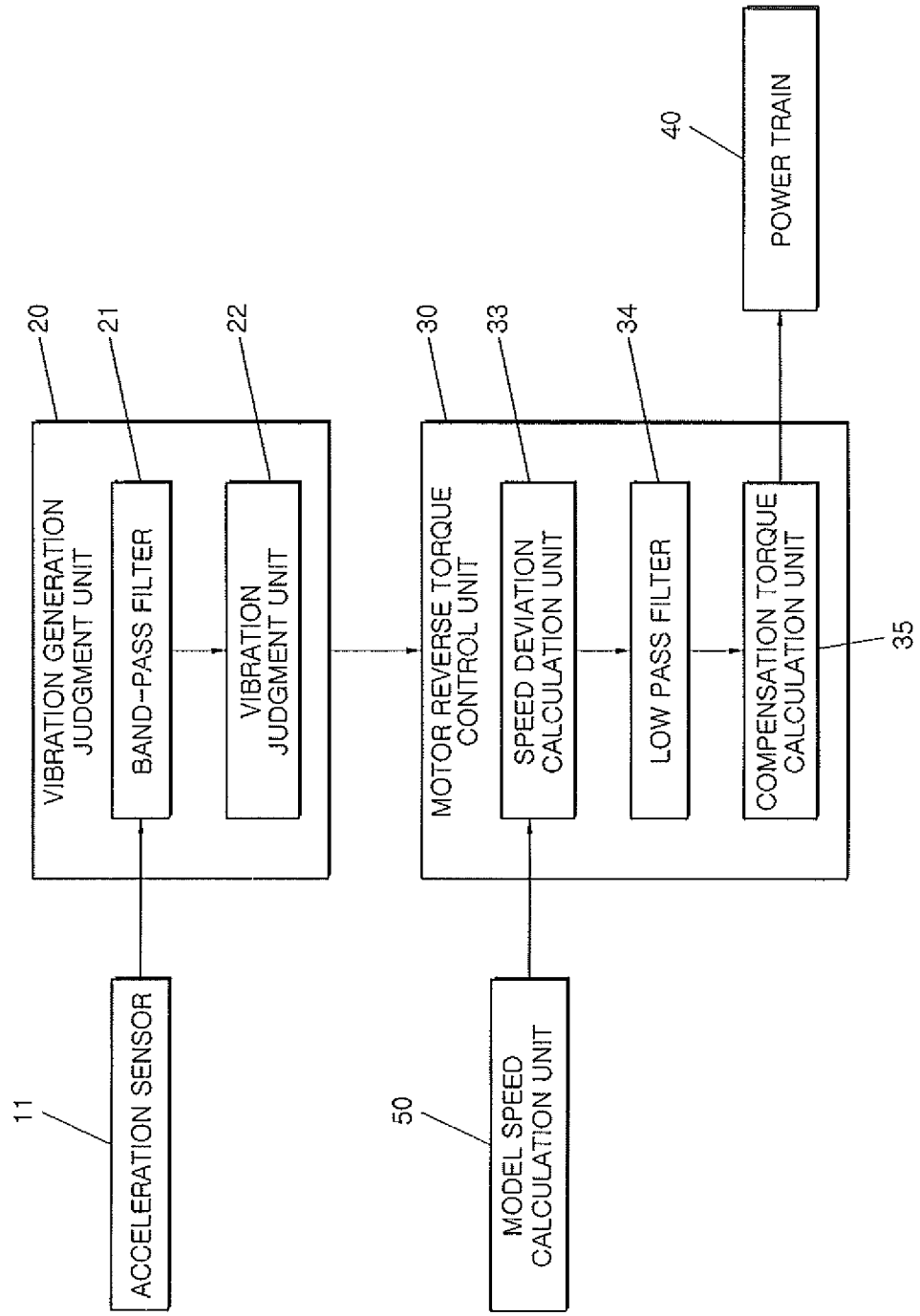
FIG. 3 is an exemplary view illustrating a control of a power train vibration reduction apparatus for an electric vehicle according to another exemplary embodiment of the present invention.

FIG. 1 is an exemplary view illustrating a control of a vibration reduction apparatus of a power train for an electric vehicle according to an exemplary embodiment the present invention. FIGS. 2 and 3 are exemplary views illustrating a vibration reduction apparatus of a power train according to another exemplary embodiment of the present invention. FIGS. 4 and 5 are exemplary flow charts of a vibration reduction method of a power train for an electric vehicle according to an exemplary embodiment the present invention.

As shown in FIG. 1, the vibration reduction apparatus 10 of a power train comprises a processor executing a plurality of units. These units include a vibration generation judgment unit 20 configured to analyze the frequency in an acceleration measured by an acceleration sensor 11 disposed in a vehicle body and to determine generated vibrations of the power train 40 when a vehicle passes on protruded portions of a road surface, and a motor reverse torque control unit 30 configured to calculate a compensation torque for vibration reduction of the power train 40 when it is determined that the vibrations have generated in the power train 40 and to control the motor torque by applying the calculated compensation torque to the motor of the power train 40.

In addition, the vibration generation judgment unit 20 may comprise a band-pass filter (BPF) 21 configured to process an acceleration sensor signal from the acceleration sensor 11 and to pass only a certain frequency band. Furthermore, the vibration judgment unit 22 may be configured to measure the magnitude of an acceleration signal component which has passed through the band-pass filter 21, to calculate a change ratio of the acceleration signal component for a certain time, to recognize the state of the road surface and to determine generated vibrations in the power train when a vehicle passes on the protruded portions of a road surface.

FIG. 2 is an exemplary view illustrating a control of a vibration reduction apparatus of a power train according to an exemplary embodiment of the present invention, which limits specifically the motor reverse torque control unit 30, executed by the processor, of the vibration reduction apparatus 10 of a power train for an electric vehicle of FIG. 1.

In the vibration reduction apparatus of a power train according to an exemplary embodiment of the present invention, the motor reverse torque control unit 30 may comprise a band-pass filter 31 configured to process a motor measurement torque signal from the motor torque measurement unit 12, executed by a processor, and to pass only a certain frequency band, and a motor torque compensation unit 32, executed by a processor, configured to estimate a demand torque of a driver by measuring the position of an accelerator pedal from the accelerator position sensor 13 and to extract a torque of a specific frequency band which has passed the band-pass filter 31 from the demand torque and to apply it to the power train 40.

FIG. 3 is an exemplary view illustrating a control of a vibration reduction apparatus 10 of a power train according to another exemplary embodiment of the present invention.

The vibration reduction apparatus of a power train according to another exemplary embodiment of the present invention as illustrated in FIG. 3 further comprises a model speed calculation unit 50, executed by the processor, configured to calculate a model speed which may be a speed with no vibrations occurring. The model speed may be calculated by subtracting the drag torque from the motor torque instruction value and then by integrating the value obtained by subtracting the total torque of the driving shaft.

Furthermore, as illustrated in FIG. 3, the motor reverse torque control unit 30 may comprise a speed deviation calculation unit 33, executed by the processor, configured to calculate in real time a speed deviation between the model speed of the motor and the actual speed, a low pass filter (LPF) 34 configured to pass a speed deviation of a specific band to obtain a speed deviation mean value, and a compensation torque calculation unit 35, executed by the processor, configured to control the motor torque for the vibration reduction of a power train by calculating the compensation torque of the motor with the aid of the model speed, the actual speed and the speed deviation mean value.

The vibration reduction method of a power train for an electric vehicle of FIG. 4 will be described with reference to the vibration reduction apparatus of a power train for an electric vehicle of FIGS. 1 and 2.

In step S10, for determining generated vibrations in the power train as an electric vehicle passes on protruded portions of a road surface, an acceleration signal of a vehicle is received from the vehicle body acceleration sensor 11 (S11), and the vehicle body acceleration sensor 11 may be formed of an acceleration sensor disposed on a vehicle body such as the acceleration sensor used for a posture control apparatus (VDC) of a vehicle body.

In addition, the acceleration signal may be transferred from the vehicle body acceleration sensor 11 to the band-pass filter 21 and only a certain frequency band is passed therethrough, and the AC component of the acceleration may be extracted in step S12. Moreover, since the vibration due to the inherent mode of the power train may be spread at 5~20 Hz, the frequency band passing through the band-pass filter 21 may be 5~20 Hz.

Furthermore, the size of the AC component of the acceleration of a specific frequency band which has passed through the band-pass filter 21 may be measured, and the change ratio per hour of the acceleration component may be calculated. Therefore, in step S13, the processor may determine whether the change ratio value exceeds a certain threshold value.

FIG. 4 is an exemplary view illustrating an example of a certain threshold value of 0.5 G/100 ms. As the value of a certain threshold value decreases, it may react more easily with respect to the vibrations occurring when a vehicle passes on the protruded portions of a road surface.

When the value of the change ratio of the AC component of the acceleration does not exceed a certain threshold value as illustrated in step S13, the method returns to step S11, and steps S11-S13 may be repeatedly performed. Additionally, if the change ratio of the AC component of the acceleration exceeds a certain threshold value, it may be determined that vibrations occurred at the power train as the vehicle passes on the protruded portions of a road surface, and the method continues to the motor reverse torque control step S20.

However, as shown in FIG. 4, when an additional motor reverse torque control (S20) for the vibration reduction from the power train is not performed, the method may return to step S11, and the previous steps are repeatedly performed (S14). The motor torque control may not be performed to eliminate an anti jerk during a tip in/tip out when a traction control system, an ABS (Anti-lock Brake System) or an electronic controlled suspension are currently being executed. The tip-in/tip-out motion occurs when a driver either applies pressure to an accelerator pedal or releasing pressure from the accelerator pedal. When the motor torque control is already in operation, the motor reverse torque control (S20) may not be performed for preventing an anti jerk control interference.

In the motor reverse control step S20, a motor measurement torque signal may be received from the motor torque measurement part 12 (S21).

In addition, to extract a motor torque change value due to the vibration of the power train, the motor measurement torque signal may be transferred to the band-pass filter 31 and only a certain frequency band is passed therethrough, the motor torque change caused by the vibrations of the power train may be extracted (S22).

The vibrations due to the inherent mode of the power train may be distributed in a range of 5~20 Hz, and the frequency band passing through the band-pass filter 31 may be 5~20 Hz for extracting the motor torque change caused due to the vibrations in the power train.

Moreover, the driver's demand torque may be estimated by measuring the position of the accelerator pedal using the accelerator position sensor 13, and the motor torque change extracted in S22 may be subtracted from the driver's demand torque, thus calculating the compensation torque applied to the motor which is a driving force source of the power train, and the calculated compensation torque may be applied to the power train, thus reducing the vibrations generated in the power train (S23).

Furthermore, the motor torque change may be compared with a peak value of the motor torque change extracted just after the vehicle has passed on the protruded portions of a road surface (S24).

In other words, the processor may determine whether the motor torque change amount is less than a certain threshold value. When the above mentioned condition is not satisfied, the method returns to step S21, and the previously explained methods are repeatedly performed. Moreover, when the motor torque change is determined to be less than a certain threshold value, the reverse torque control may be completed, and the current operation condition may be maintained. With the above operations, it may be possible to effectively attenuate the vibrations in the power train occurring as the vehicle passes on protruded portions of a road surface.

Moreover, the certain threshold value may be determined by: [gain*(peak value of the motor torque change amount just after the vehicle has passed on the protruded portions of a road surface)]. As shown in FIG. 4, the gain value, for example, may be 0.3. As the gain decreases in value, fewer vibrations may be offset; however the time for the vibration control may be prolonged.

Hereinafter the vibration reduction method of a power train for an electric vehicle of FIG. 5 will be described with reference to the vibration reduction apparatus of a power train for an electric vehicle of FIGS. 1 and 3.

In step S10 of the vibration reduction method of a power train for an electric vehicle, the vibration generations in the power train as the vehicle passes on the protruded portions of a road surface may be determined. Step S10 in FIG. 5 is same as the step for determining the vibrations of a power train of FIG. 4, therefore the detailed descriptions thereof will be omitted.

In the vibration reduction method of a power train for an electric vehicle of FIG. 5, in the motor reverse torque control step S30, the model speed which is a motor speed with no vibrations from the power train 40 and the driving shaft may be calculated by the model speed calculation part 50 (S31). The model speed may be calculated by integrating the value obtained as the drag torque which may be subtracted from the motor torque command value, and then subtracting the total torque of the driving shaft.

Further, the speed deviation value between the model speed of the motor and the actual speed in real time may be calculated, and the speed deviation may be passed through the low-pass filter 34, thus calculating the mean value of the speed deviation (S32).

Next, the motor compensation torque amount for the vibration reduction of a power train may be calculated by the compensation torque calculation unit 35, executed by the processor, and the motor toque compensation may be applied to the power train. Therefore, so motor torque control (S33) reduces the vibration reduction of the power train. The motor compensation may be calculated by: [compensation torque=gain*((model speed−actual speed)−speed deviation mean value)], and the above mentioned gain may be determined differently depending on a disconnected clutch, when gears are shifted, during tip in/out and braking operation.

Additionally, in step S34, it is determined when the speed deviation between the model speed and the actual speed becomes zero, thus determining offset vibrations in the power train.

In other words, when the speed deviation between the model speed of the motor and the actual speed is not zero, the method returns to step S31 and the previous methods are repeatedly performed. When the speed deviation between the model seed of the motor and the actual speed is zero, the reverse torque control (S30) may be completed, and the current operation condition may be maintained. With the above explained operations, it may be possible to offset the vibrations of the power train which occur as the vehicle passes on protruded portions of a road surface.

What is claimed is:

1. A vibration reduction apparatus of a power train for controlling a motor torque of a vehicle, comprising:
   a processor configured to:
      receive an acceleration signal of the vehicle from a vehicle body acceleration sensor by a band-pass filter, wherein only a certain frequency band is passed therethrough by the band-pass filter;
      measure a size of an acceleration signal component of a frequency band passed through the band-pass filter and determining an occurrence of vibrations in the power train when a change ratio per hour of the size of the acceleration signal component exceeds a threshold value;
      calculate a compensation motor torque for reducing the vibrations of the power train when the vibrations occur in the power train as the vehicle passes on protruded portions of a road surface,
   wherein the calculation of the compensation motor torque includes:
      detect a motor measurement torque signal using a band-pass filter, wherein only a certain frequency band is passed therethrough, and
      calculate the compensation motor torque to measure the size of the motor measurement torque signal component of the certain frequency band passed through the band-pass filter, to calculate the change of the motor torque caused by the vibrations of the power train and to subtract the change of the motor torque based on the vibrations of the power train from the motor torque calculated according to a driving mode of the vehicle; and
   apply the calculated compensation motor torque to the power train to compensate the vibrations in the power train.

2. The apparatus of claim 1, wherein the processor is further configured to:
   calculate a model speed of a motor having no vibrations from the power train and the driving shaft; and
   calculate zero speed deviation between the model speed of the motor and the actual speed, in response to using the negative feedback control to control the motor torque.

3. A vibration reduction method of a power train for controlling a motor torque of a vehicle, comprising:
   receiving, by a processor, an acceleration signal of the vehicle from a vehicle body acceleration sensor by a band-pass filter, wherein only a certain frequency band is passed therethrough by the band-pass filter;
   measuring, by the processor, a size of an acceleration signal component of a frequency band passed through the band-pass filter and determining an occurrence of vibrations in the power train when a change ratio per hour of the size of the acceleration signal component exceeds a threshold value;
   calculating, by the processor, a compensation motor torque for reducing the vibrations of the power train when the vibrations occur in the power train as the vehicle passes on protruded portions of a road surface, wherein the calculating of the compensation motor torque includes:

detecting, by the processor, a motor measurement torque signal using a band-pass filter, wherein only a certain frequency band is passed therethrough, and calculating, by the processor, the compensation motor torque to measure the size of the motor measurement torque signal component of the certain frequency band passed through the band-pass filter, to calculate the change of the motor torque caused by the vibrations of the power train and to subtract the change of the motor torque based on the vibrations of the power train from the motor torque calculated according to a driving mode of the vehicle; and applying, by the processor, the calculated compensation motor torque to the power train to compensate the vibrations in the power train.

4. The method of claim 3, further comprising detecting offset vibrations of the power train when the size of the motor torque change is less than a threshold vale, resulting in no compensation of the vibrations of the power train.

5. The method of claim 4, wherein the threshold value is determined by:

[threshold value=gain*(peak value of motor torque change after vehicle passed protruded portions of road surface)].

6. The method of claim 3, further comprising:

calculating, by the processor, a model speed of a motor having no vibrations of the power train and a driving shaft;

calculating, by the processor, an actual speed of the motor;

calculating, by the processor, a speed deviation mean value by obtaining a speed deviation between the model speed of the motor and the actual speed of the motor;

determining, by the processor, a motor torque compensation amount for reducing the vibrations of the power train; and calculating, by the processor, zero speed deviation between the model speed of the motor and the actual speed, in response to using a negative feedback control to which the motor torque compensation is applied to compensate the vibrations of the power train.

7. The method of claim 6, wherein the compensation motor torque is determined by: [compensation torque=gain*((model speed−actual speed)−speed deviation mean value)].

8. The method of claim 3, wherein not performing by the processor the motor torque control for the vibration reduction of the power train, when any one of a motor control in operation for a traction control system, an ABS (Anti-lock Brake System), an electronic controlled suspension or an anti-jerk in the middle of a tip-in/-out are currently being executed.

9. A non-transitory computer readable medium containing program instructions executed by a processor, the computer readable medium comprising:

program instructions receiving an acceleration signal of the vehicle from a vehicle body acceleration sensor by a band-pass filter, wherein only a certain frequency band is passed therethrough by the band-pass filter;

program instructions measuring a size of an acceleration signal component of a frequency band passed through the band-pass filter and determining an occurrence of vibrations in the power train when a change ratio per hour of the size of the acceleration signal component exceeds a threshold value;

program instructions calculating a compensation motor torque for reducing the vibrations of the power train when the vibrations occur in the power train as the vehicle passes on protruded portions of a road surface, wherein the program instructions calculating the compensation motor torque further include:

program instructions detecting a motor measurement torque signal using a band-pass filter, wherein only a certain frequency band is passed therethrough; and program instructions calculating the compensation motor torque to measure the size of the motor measurement torque signal component of the certain frequency band passed through the band-pass filter, to calculate the change of the motor torque caused by the vibrations of the power train and to subtract the change of the motor torque based on the vibrations of the power train from the motor torque calculated according to a driving mode of the vehicle; and program instructions applying the calculated compensation motor torque to the power train to compensate the vibrations of the power train.

10. The non-transitory computer readable medium of claim 9, further comprising program instructions detecting offset vibrations of the power train when the size of the motor torque change is less than a threshold vale, resulting in no compensation of the vibrations of the power train.

11. The non-transitory computer readable medium of claim 10, further comprising program instructions determining the threshold value by: [threshold value=gain*(peak value of motor torque change after vehicle passed protruded portions of road surface)].

12. The non-transitory computer readable medium of claim 9, further comprising:

program instructions calculating a model speed of a motor having no vibrations of the power train and a driving shaft;

program instructions calculating an actual speed of the motor;

program instructions calculating a speed deviation mean value by obtaining a speed deviation between the model speed of the motor and the actual speed of the motor;

program instructions determining a motor torque compensation amount for reducing the vibrations of the power train; and program instructions calculating zero speed deviation between the model speed of the motor and the actual speed, in response to using a negative feedback control to which the motor torque compensation is applied to compensate the vibrations of the power trains.

13. The non-transitory computer readable medium of claim 12, further comprising program instructions determining the compensation motor torque by: [compensation torque=gain*((model speed−actual speed)−speed deviation mean value)].

14. The non-transitory computer readable medium of claim 9, further comprising program instructions not performing the motor torque control for the vibration reduction of the power train, when any one of a motor control in operation for a traction control system, an ABS (Anti-lock Brake System), an electronic controlled suspension or an anti-jerk in the middle of a tip-in/-out are currently being executed.

* * * * *